US012694907B2

(12) United States Patent
Li et al.

(10) Patent No.: US 12,694,907 B2
(45) Date of Patent: Jul. 28, 2026

(54) METHOD, APPARATUS, DEVICE, AND STORAGE MEDIUM FOR CONTENT INTERACTION

(71) Applicant: Beijing Youzhuju Network Technology Co., Ltd., Beijing (CN)

(72) Inventors: Haoran Li, Beijing (CN); Kai Hou, Beijing (CN); Jiahao Ye, Beijing (CN); Wei Cai, Beijing (CN); Weijia Kong, Beijing (CN); Shengyan Shi, Beijing (CN); Xue Yao, Beijing (CN); Fei Wang, Beijing (CN); Hao Yang, Beijing (CN); Yunpeng Liang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/942,038

(22) Filed: Nov. 8, 2024

(65) Prior Publication Data

US 2025/0157494 A1 May 15, 2025

(30) Foreign Application Priority Data

Nov. 10, 2023 (CN) .......................... 202311501416.7

(51) Int. Cl.
*G06V 10/42* (2022.01)
*G06V 10/62* (2022.01)
(Continued)

(52) U.S. Cl.
CPC .............. *G11B 27/34* (2013.01); *G06V 10/42* (2022.01); *G06V 10/62* (2022.01); *G06V 20/46* (2022.01); *G06V 10/82* (2022.01)

(58) Field of Classification Search
CPC ........ G06V 10/42; G06V 10/62; G06V 10/82; G06V 20/40; G11B 27/34
(Continued)

(56) References Cited

U.S. PATENT DOCUMENTS

| | | | |
|---|---|---|---|
| 9,769,544 | B1 | 9/2017 | Pau |
| 2010/0262912 | A1 | 10/2010 | Cha |

(Continued)

FOREIGN PATENT DOCUMENTS

| | | |
|---|---|---|
| CN | 104168491 A | 11/2014 |
| CN | 111031349 A | 4/2020 |

(Continued)

OTHER PUBLICATIONS

Extended European Search Report for European Patent Application No. 24211580.6, mailed on Mar. 11, 2025, 7 pages.
(Continued)

*Primary Examiner* — Daquan Zhao
(74) *Attorney, Agent, or Firm* — Astute IP Law Group

(57) ABSTRACT

According to embodiments of the disclosure, a method, an apparatus, a device, and a storage medium for content interaction are provided. The method includes: playing a target video associated with a recommended object; in response to a play progress of the target video reaching a predetermined time point, superimposing and presenting, on the target video, a plurality of images corresponding to a plurality of time points of the target video, the plurality of images being associated with the recommended object; and in response to the play progress of the target video reaching a first time point of the plurality of time points, highlighting a first image corresponding to the first time point in the plurality of images, and non-highlighting other images in the plurality of images except for the first image.

19 Claims, 6 Drawing Sheets

(51) Int. Cl.
    *G06V 20/40*          (2022.01)
    *G11B 27/34*         (2006.01)
    *G06V 10/82*         (2022.01)

(58) Field of Classification Search
    USPC .......................... 386/280, 278, 282, 238, 248
    See application file for complete search history.

(56)              References Cited

U.S. PATENT DOCUMENTS

| | | |
|---|---|---|
| 2016/0239198 A1 | 8/2016 | Shenkler |
| 2020/0007926 A1 | 1/2020 | Tang et al. |
| 2022/0053233 A1 | 2/2022 | Baxter et al. |
| 2023/0044057 A1 | 2/2023 | Kang |
| 2023/0244362 A1* | 8/2023 | Zhang ................ H04N 21/4316 |
| | | 715/720 |
| 2023/0401850 A1* | 12/2023 | Schuler ................ G06Q 50/265 |
| 2024/0129580 A1* | 4/2024 | Collins ........... H04N 21/41407 |
| 2024/0163500 A1* | 5/2024 | Wang ................... H04N 21/458 |

FOREIGN PATENT DOCUMENTS

| | | |
|---|---|---|
| CN | 111541938 A | 8/2020 |
| CN | 112188255 A | 1/2021 |
| CN | 112235641 A | 1/2021 |
| CN | 112752127 A | 5/2021 |
| CN | 113630649 A | 11/2021 |
| CN | 114511359 A | 5/2022 |
| CN | 114780180 A | 7/2022 |
| CN | 114971386 A | 8/2022 |
| CN | 115878838 A | 3/2023 |
| CN | 116992073 A | 11/2023 |
| CN | 117014687 A | 11/2023 |
| EP | 3557441 A1 | 10/2019 |
| KR | 1020100028289 A | 3/2010 |
| WO | 2022068639 A1 | 4/2022 |

OTHER PUBLICATIONS

Office Action for Chinese Patent Application No. 202311501416.7, mailed on Nov. 20, 2025, 15 pages.
Notice of Allowance for Chinese Patent Application No. 202311501416.7, mailed on Mar. 13, 2026, 6 pages.

* cited by examiner

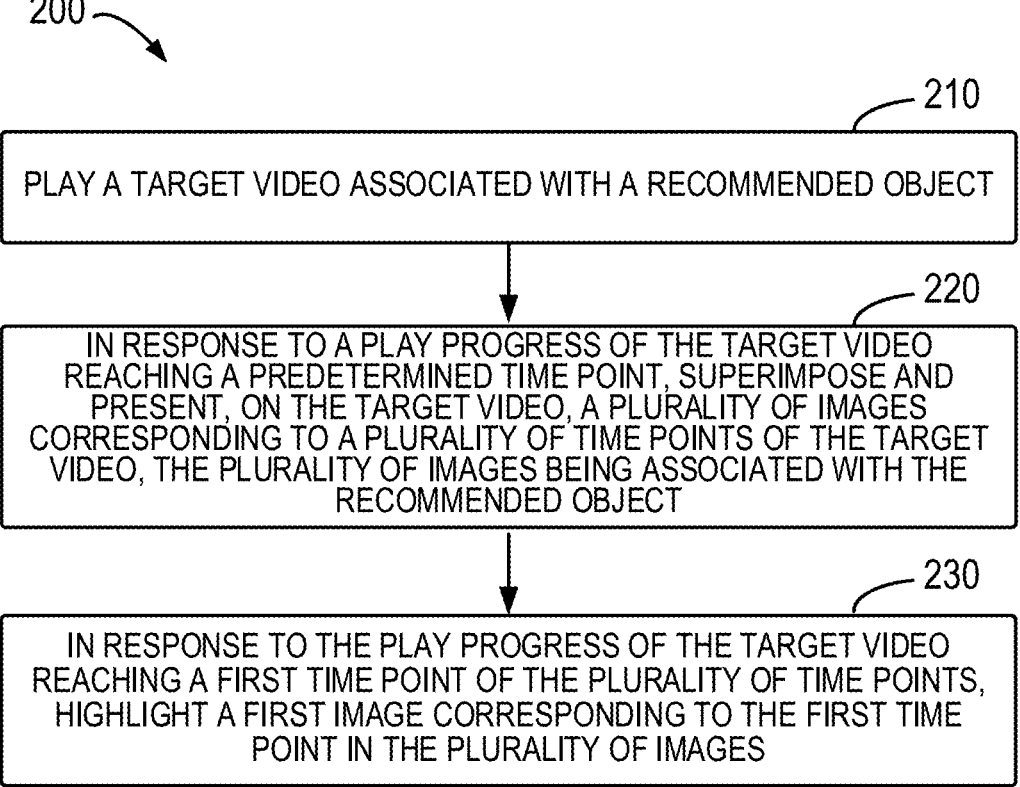

200

210

PLAY A TARGET VIDEO ASSOCIATED WITH A RECOMMENDED OBJECT

220

IN RESPONSE TO A PLAY PROGRESS OF THE TARGET VIDEO REACHING A PREDETERMINED TIME POINT, SUPERIMPOSE AND PRESENT, ON THE TARGET VIDEO, A PLURALITY OF IMAGES CORRESPONDING TO A PLURALITY OF TIME POINTS OF THE TARGET VIDEO, THE PLURALITY OF IMAGES BEING ASSOCIATED WITH THE RECOMMENDED OBJECT

230

IN RESPONSE TO THE PLAY PROGRESS OF THE TARGET VIDEO REACHING A FIRST TIME POINT OF THE PLURALITY OF TIME POINTS, HIGHLIGHT A FIRST IMAGE CORRESPONDING TO THE FIRST TIME POINT IN THE PLURALITY OF IMAGES

FIG. 2

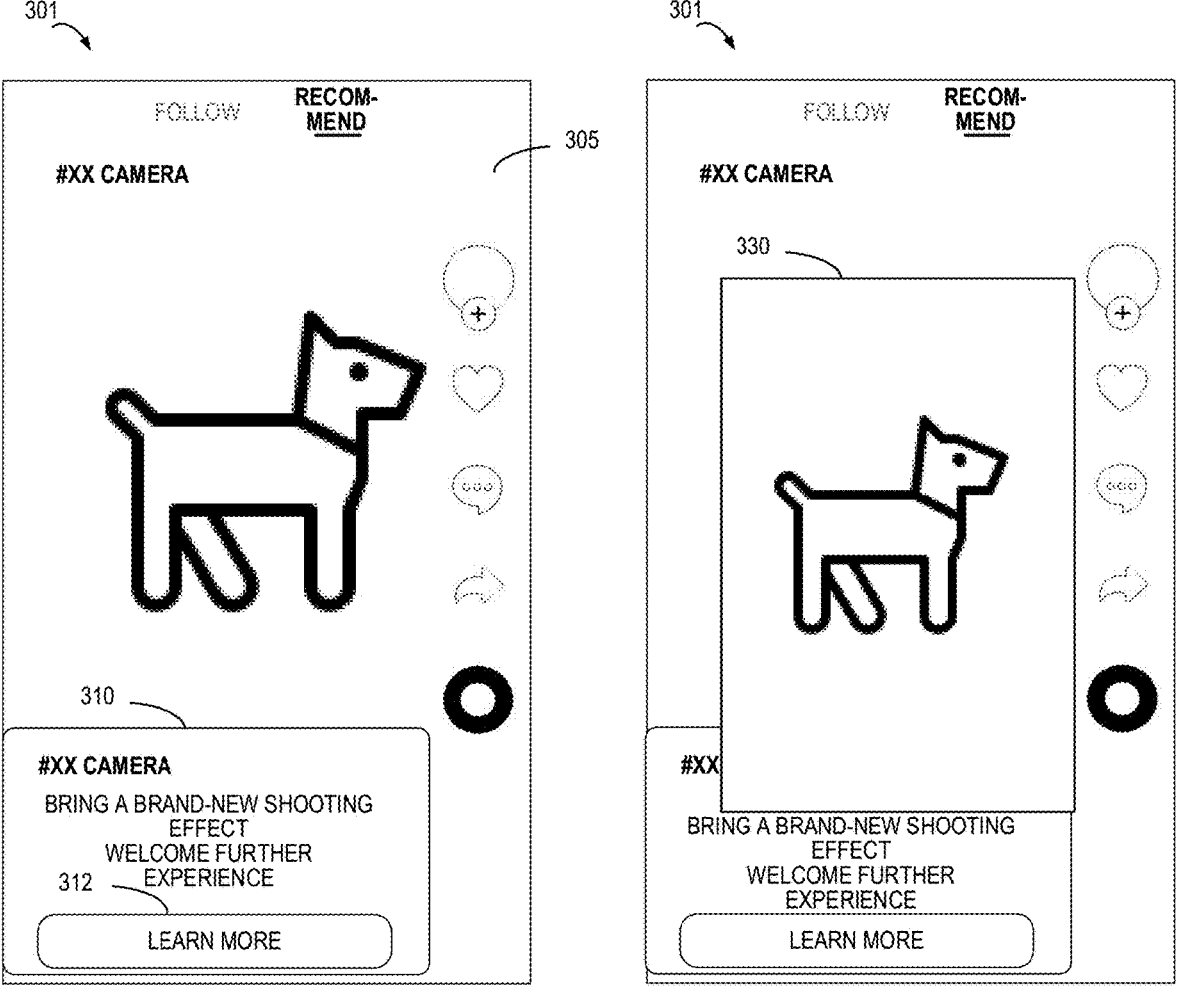
FIG. 3A                    FIG. 3B

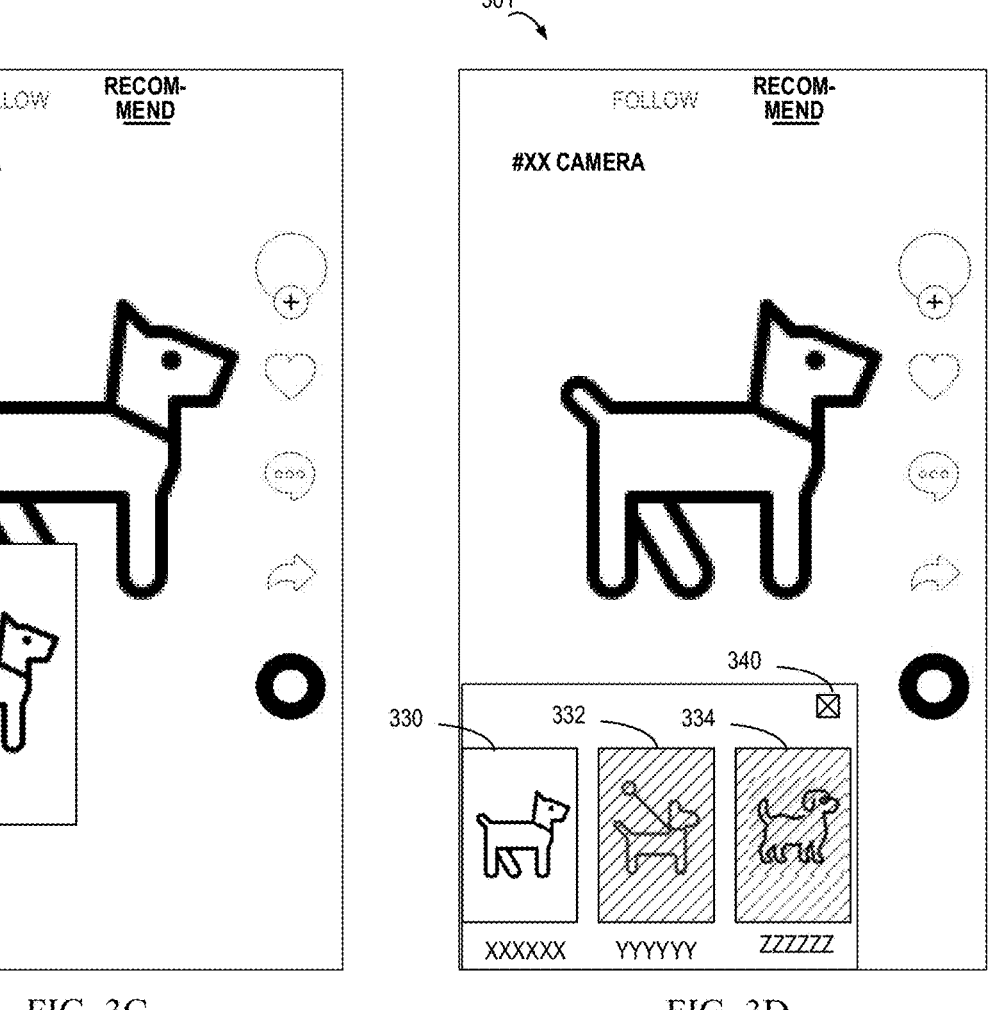
FIG. 3C                    FIG. 3D

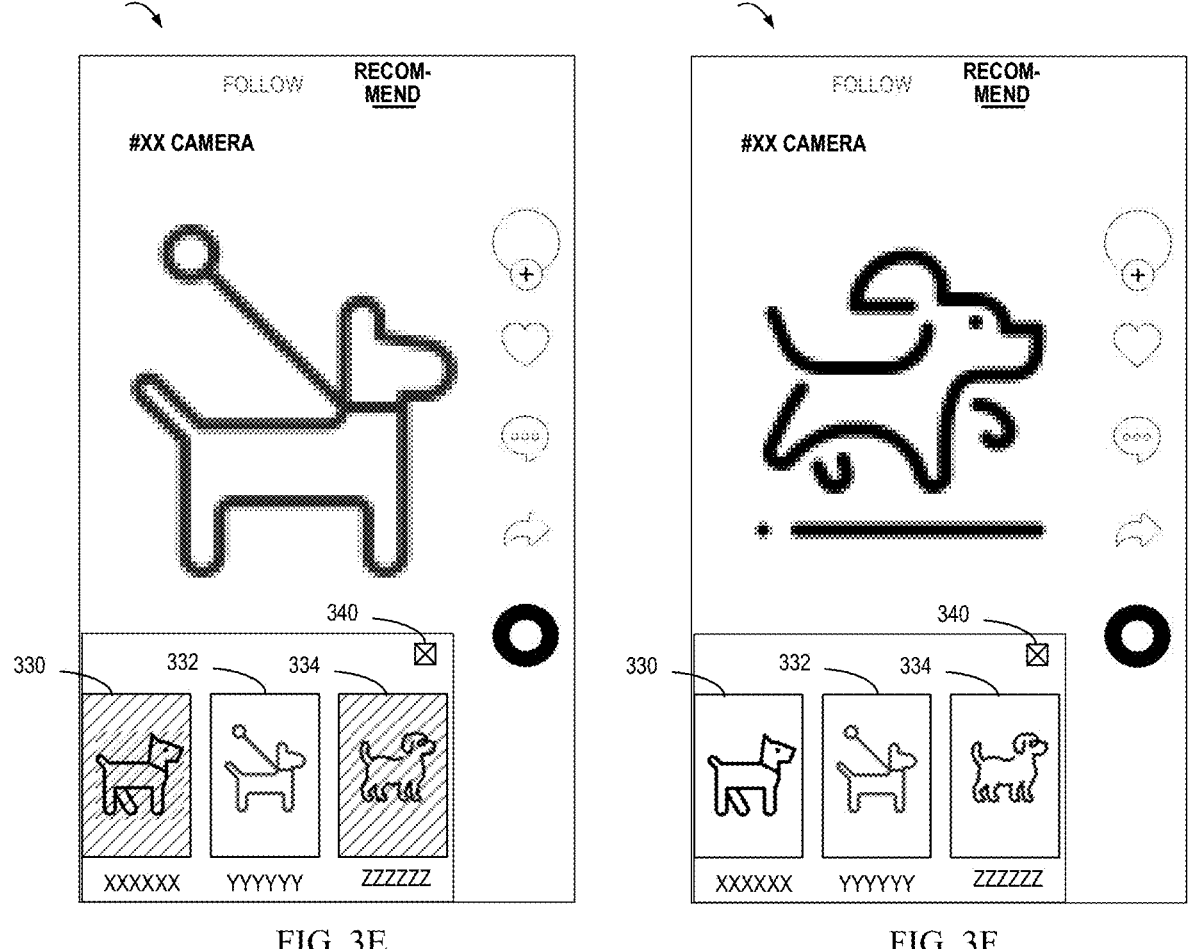
FIG. 3E                    FIG. 3F

400

500

METHOD, APPARATUS, DEVICE, AND STORAGE MEDIUM FOR CONTENT INTERACTION

CROSS REFERENCE

The application claims priority to Chinese Patent Application No. 202311501416.7, filed on Nov. 10, 2023, and entitled "METHOD, APPARATUS, DEVICE, AND STORAGE MEDIUM FOR CONTENT INTERACTION", the entirety of which is incorporated herein by reference.

FIELD

Example embodiments of the disclosure generally relate to the field of computer technologies, and in particular, to a method, an apparatus, a device, and a computer-readable storage medium for content interaction.

BACKGROUND

The Internet provides access to a wide variety of content. For example, various images, audios, videos, web pages, and the like can be accessed through the Internet. In addition, accessible content further includes specific content related to various object recommendations, such as video advertisements, graphic advertisements, and the like. In this way, users can browse content, obtain more interested information and services as needed.

SUMMARY

In a first aspect of the disclosure, a method for content interaction is provided. The method includes: playing a target video associated with a recommended object; in response to a play progress of the target video reaching a predetermined time point, superimposing and presenting, on the target video, a plurality of images corresponding to a plurality of time points of the target video, the plurality of images being associated with the recommended object; and in response to the play progress of the target video reaching a first time point of the plurality of time points, highlighting a first image corresponding to the first time point in the plurality of images, and non-highlighting other images in the plurality of images except for the first image.

In a second aspect of the disclosure, an apparatus for content interaction is provided. The apparatus includes: a video playing module configured to play a target video associated with a recommended object; an image superimposing module configured to, in response to a play progress of the target video reaching a predetermined time point, superimpose and present, on the target video, a plurality of images corresponding to a plurality of time points of the target video, the plurality of images being associated with the recommended object; and a highlighting module configured to, in response to the play progress of the target video reaching a first time point of the plurality of time points, highlight a first image corresponding to the first time point in the plurality of images, and non-highlight other images in the plurality of images except for the first image.

In a third aspect of the disclosure, an electronic device is provided. The device includes: at least one processing unit; and at least one memory coupled to the at least one processing unit and storing instructions executable by the at least one processing unit. The instructions, when executed by the at least one processing unit, cause the device to perform the method of the first aspect.

In a fourth aspect of the disclosure, a computer-readable storage medium is provided. The medium has a computer program stored thereon, and the computer program, when executed by a processor, implements the method of the first aspect.

It should be understood that the content described in the Summary section is not intended to limit key or important features of embodiments of the disclosure, nor is it intended to limit the scope of the disclosure. Other features of the disclosure will become readily understood through the following description.

BRIEF DESCRIPTION OF DRAWINGS

The above and other features, advantages and aspects of various embodiments of the disclosure will become more apparent with reference to the following detailed description in conjunction with the accompanying drawings. In the drawings, the same or similar reference numerals represent the same or similar elements, where:

FIG. 2 shows a flowchart of a process for content interaction according to some embodiments of the disclosure;

FIGS. 3A to 3F show schematic diagrams of interaction of example pages according to some embodiments of the disclosure;

DETAILED DESCRIPTION

Figure 1:
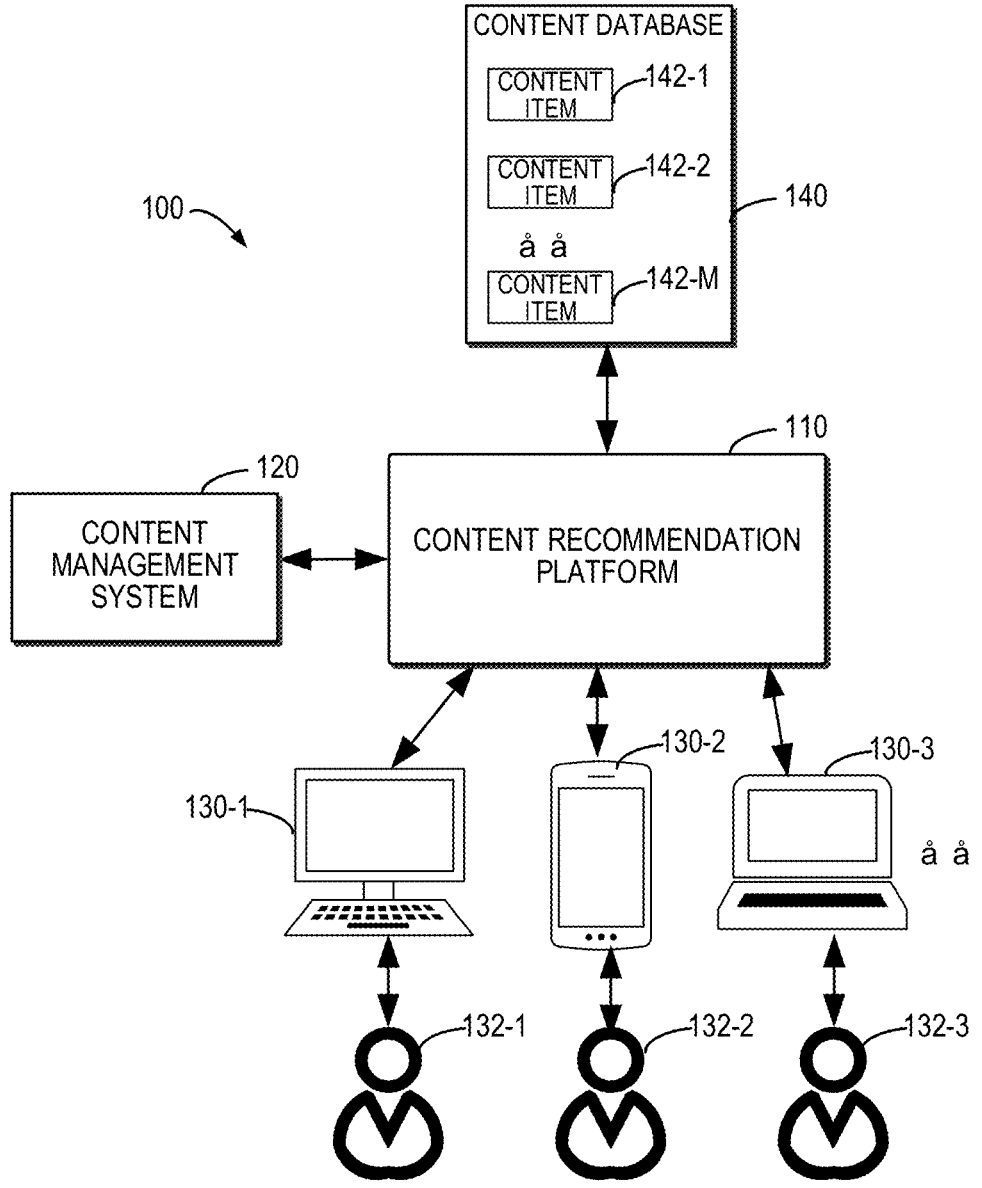
FIG. 1 shows a schematic diagram of an example environment in which the embodiments of the disclosure can be implemented.

Embodiments of the disclosure will be described in more detail below with reference to the accompanying drawings. Although some embodiments of the disclosure are shown in the drawings, it should be understood that the disclosure can be implemented in various forms and should not be construed as being limited to the embodiments set forth herein. Rather, these embodiments are provided for a more thorough and complete understanding of the disclosure. It should be understood that the accompanying drawings and embodiments of the disclosure are only for illustrative purposes, and not intended to limit the scope of protection of the disclosure.

In the description of the embodiments of the disclosure, the term "include/comprise" and similar terms should be understood as open inclusion, that is, "include/comprise but not limited to". The term "based on" should be understood as "at least partially based on". The term "an embodiment" or "the embodiment" should be understood as "at least one embodiment". The term "some embodiments" should be understood as "at least some embodiments". Other definitions, either explicit or implicit, may also be included below.

It will be appreciated that the data involved in the technical solutions of the disclosure (including but not limited to the data itself, the acquisition or use of the data) should comply with the requirements of the corresponding laws, regulations and related provisions.

It will be appreciated that before using the technical solutions disclosed in the embodiments of the disclosure, the types, scope of use, and usage scenarios of personal information involved in the disclosure should be informed to the users and the authorization of users should be obtained through appropriate means in accordance with the relevant laws and regulations.

For example, when receiving an active request from a user, a prompt message is sent to the user to explicitly prompt the user that the operation requested by the user will need to acquire and use the personal information of user, so that the user can independently choose whether to provide the personal information to the software or hardware that performs the operation of the technical solution of the disclosure, such as an electronic device, an application, a server, or a storage medium, according to the prompt message.

As an optional but non-limiting implementation, the manner of sending a prompt message to the user in response to receiving the active request from the user, for example, may be in the form of a pop-up window, and the prompt message may be presented in the pop-up window in text. In addition, the pop-up window may also carry a selection control for the user to select "agree" or "disagree" to provide personal information to the electronic device.

It will be appreciated that the above process of notification and obtaining user authorization is only illustrative and does not limit the implementation of the disclosure, and other manners that meet the relevant laws and regulations may also be applied to the implementation of the disclosure.

As used herein, the term "model" may learn an association between corresponding input and output from training data, so that after the training is completed, corresponding output may be generated for a given input. The generation of the model may be based on machine learning techniques. Deep learning is a machine learning algorithm that processes input and provides a corresponding output using multiple layers of processing units. A neural network model is an example of a deep learning-based model. Herein, a "model" may also be referred to as a "machine learning model", a "learning model", a "machine learning network", or a "learning network", which terms are used interchangeably herein.

A "neural network" is a machine learning network based on deep learning. The neural network can process input and provide a corresponding output, and usually includes an input layer and an output layer, and one or more hidden layers between the input layer and the output layer. The neural network used in deep learning applications usually includes many hidden layers, thereby increasing the depth of the network. The layers of the neural network are connected in sequence, so that the output of the previous layer is provided as the input of the next layer, where the input layer receives the input of the neural network, and the output of the output layer is used as the final output of the neural network. Each layer of the neural network includes one or more nodes (also referred to as processing nodes or neurons), and each node processes input from the previous layer.

Generally, the machine learning can roughly include three stages, namely, a training stage, a testing stage, and an application stage (also referred to as an inference stage). In the training stage, a given model may be trained using a large amount of training data, and the parameter values are updated iteratively until the model can obtain consistent inferences that meet expected goals from the training data. Through training, the model may be considered to be able to learn an association (also referred to as an input-to-output mapping) from input to output from the training data. The parameter values of the trained model are determined. In the testing stage, test input is applied to the trained model to test whether the model can provide correct output, thereby determining the performance of the model. In the application stage, the model may be used to process actual input based on the parameter values obtained through training, and determine corresponding output.

FIG. 1 shows a schematic diagram of an example environment 100 in which the embodiments of the disclosure can be implemented. One or more content providers can use a content management system 120 to manage content to be provided on a content recommendation platform 110. One or more terminal devices 130-1, 130-2, 130-3, etc. (collectively or individually referred to as terminal devices 130 for case of discussion) are associated with the content recommendation platform 110 and can access various types of content provided on the content recommendation platform 110.

The content recommendation platform 110 is configured to present a recommended content item in a placement opportunity. The recommended content item to be recommended may include, for example, one or more recommended content items 122-1, 122-2, . . . , 122-M (collectively or individually referred to as recommended content items 122 for case of discussion) in a content database 120. As an example, the content recommendation platform 110 may be an application, a website, a web page, and other accessible resources. The terminal device 130 may have an application installed thereon for accessing the content recommendation platform 110, or may access the content recommendation platform 110 in a suitable manner. The terminal device 130 may access various types of content provided on the content recommendation platform 110 based on a corresponding user 132-1, 132-2, 132-3, etc. (collectively or individually referred to as users 132 for case of discussion). In addition to the content item for object recommendation, the content recommendation platform 110 may also provide various other content to the terminal device 130, such as content uploaded and published by other users.

The content provider may provide different content to different terminal devices 130 based on management requirements and user operations at the terminal devices 130. The content management system 120 may provide one or more specific content items related to one or more objects to the terminal device 130, for example, one or more content items 142-1, 142-2, . . . , 142-M (collectively or individually referred to as content items 142 for case of discussion) in a content database 140. These content items may include, for example, advertisements. The object associated with the content item includes, for example, an object targeted by the advertisement, for recommending a specific object to an audience. The object herein may include, for example, an entity object, a virtual object, a service, and the like. The form of the content item 142 may be in the form of video or graphic and text.

In some embodiments, the content management system 120 may determine the content items 142 to be provided to the one or more terminal devices 130 at least based on a request from an object provider. In the context of advertisement placement, the object provider is sometimes also referred to as an advertiser.

In the environment 100, the terminal device 130 may be any type of mobile terminal, fixed terminal or portable terminal, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/video camera, a positioning device, a TV receiver, a radio broadcast receiver, an e-book device, a gaming device, or any combination thereof, including accessories and peripherals of these devices, or any combination thereof. In some embodiments, the terminal device 130 may also support any type of user-specific interface (such as a "wearable" circuit, etc.). The content management system 120 may, for example, be various types of computing systems/servers capable of providing computing power, including but not limited to mainframes, edge computing nodes, computing devices in a cloud environment, and the like.

It should be understood that the structure and function of each element in the environment 100 are described for illustrative purposes only, and do not imply any limitation to the scope of the disclosure.

In the case of recommending an object in the form of video, the users may need to spend a long time browsing the complete video to obtain all the recommendation information. Some users may switch the video playing because they fail to learn the interested information within a short time of video playing, thus missing the subsequent interested information. In addition, as streaming content, in the video content, it is usually necessary to highlight certain features through special effects, or to set key frames for certain important parts on the progress bar of the video to facilitate the user to select and jump to browse. However, this also brings more challenges for content creation. Moreover, as shown above, since it cannot be ensured that the user can always browse the video completely when the video is placed, such content creation may not always be visible to the user.

In the example embodiments of the disclosure, an improved content solution is provided. According to the solution, a target video associated with a recommended object is played; in response to a play progress of the target video reaching a predetermined time point, a plurality of images corresponding to a plurality of time points of the target video are superimposed and presented on the target video, the plurality of images being associated with the recommended object; and in response to the play progress of the target video reaching a first time point of the plurality of time points, a first image corresponding to the first time point in the plurality of images is highlighted, and other images in the plurality of images except for the first image are non-highlighted.

According to the embodiments of the disclosure, image content can be further enhanced at a specific time point during video playing, providing more effective, convenient, and attractive content browsing and interaction. In the context of object recommendation, more features of the object to be recommended can be enhanced through superimposed and sequentially highlighted images, so that the user can learn and expect the presentation of these features at one time while browsing the video, to determine their interests. In addition, more information about the recommended object can be obtained through the images highlighted at different time points and in combination with the video content, which can meet various needs of the user for content interaction. On the other hand, the effect of object recommendation is improved.

Some example embodiments of the disclosure will be described below with reference to the accompanying drawings.

FIG. 2 shows a flowchart of a process 200 for content interaction according to some embodiments of the disclosure. For case of discussion, the process 200 will be described with reference to the environment 100 of FIG. 1. The process 200 may be implemented in the terminal device 130 in the environment 100.

At block 210, the terminal device 130 plays a target video associated with a recommended object. The target video may, for example, be a content item 142 in the form of a video for recommending an object. The recommended object related to the target video includes, for example, an object targeted by an advertisement, for recommending a specific object to an audience. The object herein may include, for example, an entity object, a virtual object, a service, and the like. In some embodiments, such a target video may also be referred to as a video advertisement. Generally, the target video associated with the recommended object may focus on displaying and introducing related information of the recommended object, so that viewers can learn more about the object to determine whether to perform related other actions.

For a better understanding of the example embodiments, the following will describe a schematic diagram of example content interaction in a page according to some embodiments of the disclosure with reference to the example pages shown in FIGS. 3A to 3F. In these examples, the user interface 301 may be shown as a page or a page area of an application running on the terminal device 130. The application herein is an application that supports video playing, browsing, and/or sharing. Although some operations are described in conjunction with the terminal device 130, it should be understood that these operations may be implemented by an application running on the terminal device 130. It should also be understood that the pages shown in the drawings are only examples, and there may actually be various page designs. Each graphical element in the page may have a different arrangement and a different visual representation, one or more of the elements may be omitted or replaced, and there may also be one or more other elements. The embodiments of the disclosure are not limited in this respect.

In FIG. 3A, a target video 305 associated with a recommended object (for example, "XX camera") is played in the user interface 301. In some embodiments, the play of the target video 305 may be based on a trigger action of the user or any other appropriate action.

In some embodiments, when playing the target video, an entry card may be superimposed and presented on the target video, and the entry card indicates an access entry to the recommended object. Through the access entry; a jump can be made from a play page of the target video 305 to a page related to the recommended object.

In some embodiments, the target video and the entry card may be presented in different display layers, and the display layer of the entry card (sometimes also referred to as a floating layer, a superimposing layer, or a sticker layer) may be superimposed on the display layer of the target video to facilitate user operation.

As shown in FIG. 3A, an entry card 310 is superimposed and presented on the target video 305, and the entry card 310 includes an access entry 312 to the recommended object. In some implementations, by triggering the access entry 312 or by triggering the entry card 310, a jump can be made to a detail page related to the recommended object. The specific trigger manner and trigger position may be configured based on the actual application. The presentation timing, presentation manner, and presentation position of the entry card may be configured according to the actual application. The embodiments of the disclosure are not limited in this respect.

Referring back to FIG. 2, at block 220, the terminal device 130, in response to a play progress of the target video reaching a predetermined time point, superimposes and presents, on the target video, a plurality of images corresponding to a plurality of time points of the target video, the plurality of images being associated with the recommended object.

That is, after the target video is played for a certain period of time, more image information associated with the recommended object related to the target video is superimposed and presented on the target video. As shown in FIG. 3D, after the target video 305 is played to a predetermined time point, a plurality of images 330, 332, and 334 are superimposed and presented on the target video 305. It should be noted that although a specific number of images are shown, the number and display position of the images may be selected and configured as needed in specific applications.

In some embodiments, in addition to superimposing and presenting a plurality of images on the target video, annotation information respectively associated with the plurality of images may also be superimposed and presented on the target video, and the annotation information is used to describe the recommended object. Such graphic and text materials can provide more information about the recommended object, allowing users to obtain richer information.

At block 230, the terminal device 130, in response to the play progress of the target video reaching a first time point of the plurality of time points, highlights a first image corresponding to the first time point in the plurality of images, and non-highlights other images in the plurality of images except for the first image.

Since the plurality of images respectively correspond to the plurality of time points in the target video, as the play progress of the target video proceeds, the corresponding images can be highlighted respectively at the corresponding time points. Herein, "highlighting" a specific image means that the specific image is more prominently displayed in a display manner different from other images. The highlighting manner may, for example, superimpose a shadow on other images but not on the current image, or enlarge the current image, make the brightness of the current image brighter, superimpose other visual elements, and the like. The embodiments of the disclosure do not further limit the specific highlighting manner.

In some embodiments, the image corresponding to each time point may be highlighted for a period of time, or may be highlighted until the image of the next time point is to be highlighted. In this way, in response to the play progress of the target video reaching a second time point after the first time point, the highlighting can be switched from the first image to a second image corresponding to the second time point in the plurality of images, and other images in the plurality of images except for the second image are not highlighted. That is, as the target video is played, the image to be highlighted is switched one by one. In this way, the play of the target video and the graphic and text information to be highlighted at each time point can be linked and presented to the user.

In some embodiments, the plurality of images may be superimposed and presented on the target video in an order of the plurality of time points. In this way, the images corresponding to each time point can be switched and highlighted in sequence (for example, from left to right or from top to bottom), and the images of other time points are not highlighted but can be visible to the user.

For example, in FIG. 3D, since the current play progress of the target video 305 reaches the time point corresponding to the image 330, the image 330 is highlighted, while the other images 332 and 334 are not highlighted. In the example of FIG. 3D, the highlighting manner is to make the image 330 highlighted, while the other images 332 and 334 are superimposed with a shadow. As the target video 305 continues to play, when the play reaches the time point corresponding to the image 332, as shown in FIG. 3E, the highlighting is switched from the image 330 to the image 332, while the images 330 and 334 will be superimposed with a shadow at this time to achieve the purpose of weakened display. Further, when the target video 305 is played to the time point corresponding to the image 334, as shown in FIG. 3F, the highlighting is switched from the image 330 to the image 334, while the images 330 and 332 will be superimposed with a shadow at this time.

Through the highlighting manner, it makes it easier for the user to notice the image associated with the current video play progress, and enables the user to obtain more information associated with the recommended object from the image (and possibly also from the corresponding text information). In addition, although other images are not highlighted, the user can still notice that there may be some important information related to the recommended object in the future. Therefore, the user may be more willing to continue watching the video, or quickly determine whether they are interested in the object.

In some embodiments, the plurality of images, which time points in the target video are respectively associated with the plurality of images, and at which predetermined time point the plurality of images are superimposed and presented may be configured by a provider of the target video. Such configuration may be saved as configuration information of the target video, and the configuration information indicates that the plurality of images is respectively associated with the plurality of time points of the target video.

Through such configuration, the provider of the target video may define, as needed, information associated with the recommended object that is expected to be enhanced and displayed at different time points of the target video. In subsequent play of the target content, the configuration information may be used to configure superimposing and presenting the plurality of images on the target video and highlighting the plurality of images respectively when the play progress of the target video reaches the plurality of time points.

In some embodiments, the plurality of images superimposed and presented on the target video will replace an entry card previously superimposed and presented on the target video. For example, the plurality of images 330, 332, and 334 in FIG. 3D replace the entry card 310 shown in FIG. 3A. Of course, in other implementations, the entry card and the plurality of images may also be presented simultaneously.

In some embodiments, the plurality of time points may include the predetermined time point that triggers the superimposing and presenting. Correspondingly, one of the plurality of images also corresponds to the predetermined time point. In this way, when the target video is played to the predetermined time point, not only the plurality of images is superimposed on the target video, but also the image corresponding to the predetermined time point in the plurality of images is highlighted, so that the user can notice more information related to the recommended object at this time point.

In some embodiments, a predetermined image corresponding to the predetermined time point in the plurality of images may match a video frame of the target video at the predetermined time point. In response to the play progress of the target video reaching the predetermined time point, the terminal device 130 may present a video screenshot animation indicating that the video frame of the target video at the predetermined time point is captured as a predetermined image corresponding to the predetermined time point. Such a capture effect can make it easier for the user to notice the information at the predetermined time point, and make it easier for the user to be guided and understand the information associated with the recommended object that can be expressed by the plurality of superimposed and presented images. The video screenshot animation may be presented as an "instant camera" animation effect to achieve a richer visual browsing experience.

In some embodiments, the plurality of images is superimposed and presented at predetermined positions of a play area of the target video. Further, in response to the play progress of the target video reaching the predetermined time point, the terminal device 130 may move a predetermined image corresponding to the predetermined time point from a center position of the play area to the predetermined position. Such a moving effect can draw the attention of user to the plurality of images to be presented, so that the user can obtain more information associated with the recommended object from these images.

As shown in FIG. 3B and FIG. 3C, when the play progress of the target video 305 reaches the predetermined time point, the video frame at the predetermined time point is captured as a predetermined image 330 corresponding to the predetermined time point. In addition, the predetermined image 330 may be moved from the center of the play area of the target video 305 to an area to be presented, for example, the lower left corner of the play area, as shown in FIG. 3C. During the moving process, the predetermined image 330 may be reduced until it conforms to the display size shown in FIG. 3D. In this process, the attention of user can be guided to the set of a plurality of images shown in FIG. 3D.

In some embodiments, if the play progress of the target video proceeds to behind a last time point of the plurality of time points, or after the highlighting time period of the image corresponding to the last time point is completed, the plurality of images may be superimposed and presented on the target video in a consistent display manner. At this time, there may be no difference between highlighting and non-highlighting in the plurality of images, and the user can notice the plurality of images at one time. As shown in FIG. 3F, after the plurality of images 330, 332, and 334 are respectively highlighted sequentially, the presentation manners of these images are consistent, for example, none of them are superimposed with a shadow.

In some embodiments, while the plurality of images is superimposed and presented, a close control may also be provided, such as the close control 340 shown in FIG. 3D to FIG. 3F. The user may choose to close the superimposing and presenting of these images (and associated text) as needed.

In some embodiments, in response to detecting a trigger operation on the close control, the superimposing and presenting of the plurality of images may be cancelled. In some embodiments, after the superimposing and presenting of the plurality of images is cancelled, the entry card may continue to be presented, such as the entry card 310 shown in FIG. 3A, or the entry card may no longer be presented. The embodiments of the disclosure are not limited in this respect.

In some embodiments, while the plurality of images is still superimposed and presented on the target video, the user may be allowed to select a corresponding image to jump the target video to a corresponding play progress. For example, in response to detecting a selection operation on an image in the plurality of images, the play progress of the target video is switched to the time point corresponding to the selected image.

In some embodiments, while the plurality of images is still superimposed and presented on the target video, all or part of the presentation area of the plurality of images may be set to be capable of triggering a detail page related to the recommended object. In this way, if the user is interested in the recommended object during the play of the target video, they can jump from the current page to the detail page related to the recommended object by triggering or clicking all or part of the presentation area.

In the above embodiments, by superimposing graphic and text materials on the video and highlighting the corresponding graphic and text materials in conjunction with the play of the video, it is possible to further enhance the image content at a specific time point during the video play. This provides more effective, convenient, and attractive content browsing and interaction. In the context of object recommendation, more features of the object to be recommended can be enhanced through superimposed and sequentially highlighted images, so that the user can learn and expect the presentation of these features at one time while browsing the video, to determine their interests. In addition, more information about the recommended object can be obtained through the images highlighted at different time points and in combination with the video content, which can meet various needs of the user for content interaction and improve the effect of object recommendation.

Figure 4:
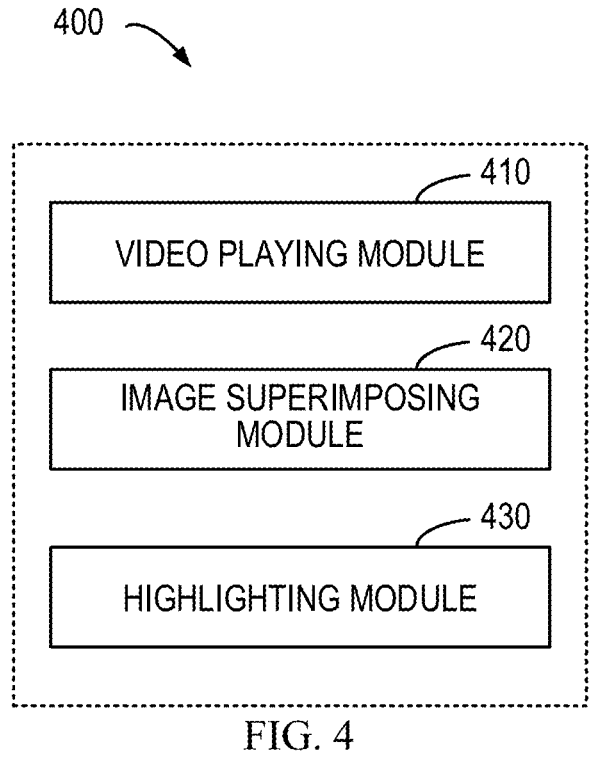
FIG. 4 shows a block diagram of an apparatus for content interaction according to some embodiments of the disclosure.

FIG. 4 shows a schematic block diagram of an apparatus 400 for content interaction according to some embodiments of the disclosure. The apparatus 400 may be implemented as or included in the terminal device 130 and/or the content recommendation platform 110. Each module/component in the apparatus 400 may be implemented by hardware, software, firmware, or any combination thereof.

As shown in the figure, the apparatus 400 includes a video playing module 410 configured to play a target video associated with a recommended object. The apparatus 400 also includes an image superimposing module 420 configured to, in response to a play progress of the target video reaching a predetermined time point, superimpose and present, on the target video, a plurality of images corresponding to a plurality of time points of the target video, the plurality of images being associated with the recommended object. The apparatus 400 also includes a highlighting module 430 configured to, in response to the play progress of the target video reaching a first time point of the plurality of time points, highlight a first image corresponding to the first time point in the plurality of images, and non-highlight other images in the plurality of images except for the first image.

In some embodiments, the apparatus 400 further includes a highlighting switching module configured to: in response to the play progress of the target video reaching a second time point after the first time point, switch the highlighting from the first image to a second image corresponding to the second time point in the plurality of images, and non-highlight other images in the plurality of images except for the second image.

In some embodiments, the plurality of time points comprises the predetermined time point, and a predetermined image corresponding to the predetermined time point in the plurality of images matches a video frame of the target video at the predetermined time point.

In some embodiments, the apparatus 400 further includes an animation presenting module configured to: in response to the play progress of the target video reaching the predetermined time point, present a video screenshot animation indicating that the video frame of the target video at the predetermined time point is captured as the predetermined image.

In some embodiments, the plurality of images is superimposed and presented at predetermined positions of a play area of the target video. In some embodiments, the apparatus 400 further includes an image moving module configured to, in response to the play progress of the target video reaching the predetermined time point, move the predetermined image from a center position of the play area to the predetermined position.

In some embodiments, the plurality of images is superimposed and presented on the target video in an order of the plurality of time points.

In some embodiments, the image superimposing module 420 includes an annotation superimposing module configured to: superimpose and present, on the target video, the plurality of images and annotation information respectively associated with the plurality of images, and the annotation information is used to describe the recommended object.

In some embodiments, the apparatus 400 further includes a consistent displaying module configured to: in response to the play progress of the target video proceeding to behind a last time point of the plurality of time points, superimpose and present the plurality of images on the target video in a consistent display manner.

In some embodiments, configuration information of the target video indicates that the plurality of images is respectively associated with the plurality of time points of the target video. In some embodiments, the configuration information is used to configure superimposing and presenting the plurality of images on the target video and highlighting the plurality of images respectively when the play progress of the target video reaches the plurality of time points.

In some embodiments, the image superimposing module 420 includes a replacement presenting module configured to: replace an entry card superimposed and presented on the target video with the plurality of images, and the entry card indicates an access entry to the recommended object.

Figure 5:
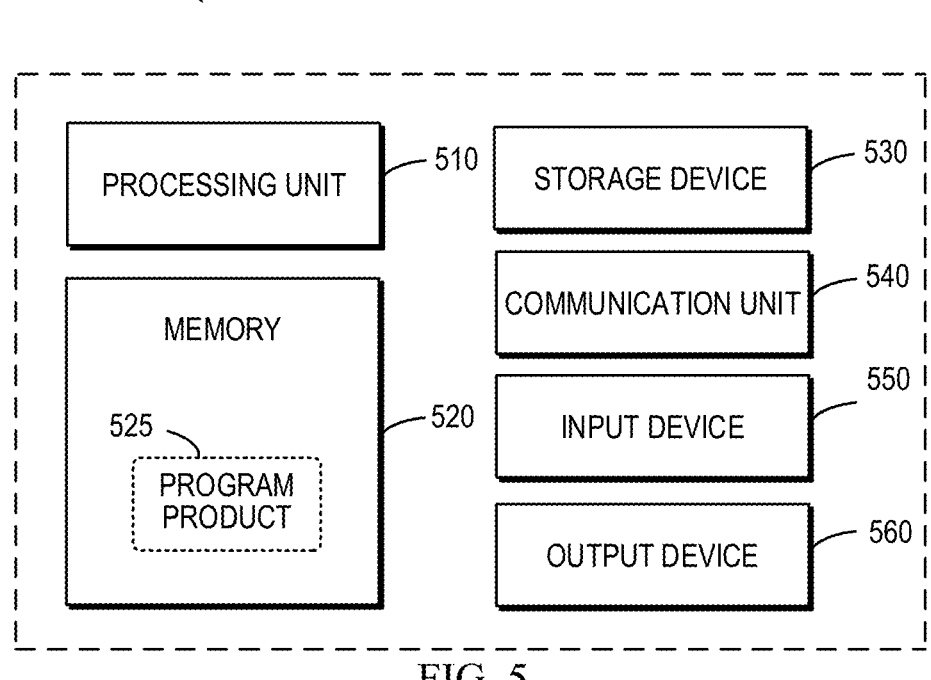
FIG. 5 shows an electronic device in which one or more embodiments of the disclosure may be implemented.

FIG. 5 shows a block diagram of an electronic device 500 in which one or more embodiments of the disclosure may be implemented. It should be understood that the electronic device 500 shown in FIG. 5 is merely an example, and should not constitute any limitation to the function and scope of the embodiments described herein. The electronic device 500 shown in FIG. 5 may be used to implement the terminal device 130, the content recommendation platform 110 or the content management system 120 in FIG. 1, or the apparatus 400 in FIG. 4.

As shown in FIG. 5, the electronic device 500 is in the form of a general-purpose computing device. Components of the electronic device 500 may include, but are not limited to, one or more processors or processing units 510, a memory 520, a storage device 530, one or more communication units 540, one or more input devices 550, and one or more output devices 560. The processing unit 510 may be a physical or virtual processor and can execute various processes according to a program stored in the memory 520. In a multi-processor system, multiple processing units execute computer-executable instructions in parallel to improve the parallel processing capability of the electronic device 500.

The electronic device 500 usually includes a plurality of computer storage media. Such media may be any available media accessible by the electronic device 500, including but not limited to volatile and non-volatile media, removable and non-removable media. The memory 520 may be a volatile memory (for example, a register, a cache, a random-access memory (RAM)), a non-volatile memory (for example, a read-only memory (ROM), an electrically erasable programmable read-only memory (EEPROM), a flash memory), or some combination thereof. The storage device 530 may be a removable or non-removable medium, and may include a machine-readable medium, such as a flash drive, a disk, or any other medium, which can be used to store information and/or data (such as training data for training) and can be accessed within the electronic device 500.

The electronic device 500 may further include additional removable/non-removable, volatile/non-volatile storage media. Although not shown in FIG. 5, a disk drive for reading from or writing to a removable, non-volatile disk (such as a "floppy disk") and an optical disk drive for reading from or writing to a removable, non-volatile optical disk may be provided. In such cases, each drive may be connected to a bus (not shown) via one or more data medium interfaces. The memory 520 may include a computer program product 525 having one or more program modules configured to perform various methods or actions of various embodiments of the disclosure.

The communication unit 540 communicates with other electronic devices through a communication medium. Additionally, the functions of the components of the electronic device 500 may be implemented by a single computing cluster or multiple computing machines that can communicate through communication connections. Therefore, the electronic device 500 can operate in a networked environment using logical connections with one or more other servers, network personal computers (PCs), or another network node.

The input device 550 may be one or more input devices, such as a mouse, a keyboard, a trackball, and the like. The output device 560 may be one or more output devices, such as a display, a speaker, a printer, and the like. The electronic device 500 may also communicate with one or more external devices (not shown) via the communication unit 540 as needed, such as storage devices, display devices, and the like, communicate with one or more devices that enable users to interact with the electronic device 500, or communicate with any device (such as a network card, a modem, etc.) that enables the electronic device 500 to communicate with one or more other electronic devices. Such communication may be performed via an input/output (I/O) interface (not shown).

According to an example implementation of the disclosure, there is provided a computer-readable storage medium having stored thereon computer-executable instructions, where the computer-executable instructions are executed by a processor to implement the method described above. According to an example implementation of the disclosure, there is also provided a computer program product that is tangibly stored on a non-transitory computer-readable medium and includes computer-executable instructions, which are executed by a processor to implement the method described above.

The various aspects of the disclosure are described herein with reference to the flowcharts and/or block diagrams of the methods, apparatuses, devices, and computer program products implemented according to the disclosure. It should be understood that each block of the flowcharts and/or block diagrams and a combination of blocks in the flowcharts and/or block diagrams may be implemented by computer-readable program instructions.

These computer-readable program instructions may be provided to a processing unit of a general-purpose computer, a special-purpose computer, or another programmable data processing apparatus to produce a machine, such that when the instructions are executed by the processing unit of the computer or another programmable data processing apparatus, an apparatus for implementing the functions/actions specified in one or more blocks in the flowcharts and/or block diagrams is created. These computer-readable program instructions may also be stored in a computer-readable storage medium, and these instructions enable a computer, a programmable data processing apparatus, and/or another device to work in a specific manner. Therefore, a computer-readable medium storing the instructions includes a product manufactured, which includes instructions for implementing various aspects of the functions/actions specified in one or more blocks in the flowcharts and/or block diagrams.

The computer-readable program instructions may be loaded onto a computer, another programmable data processing apparatus, or another device, so that a series of operation steps are performed on the computer, another programmable data processing apparatus, or another device, to produce a computer-implemented process, such that the instructions executed on the computer, another programmable data processing apparatus, or another device implement the functions/actions specified in one or more blocks in the flowcharts and/or block diagrams.

The flowcharts and block diagrams in the accompanying drawings show the possibly implemented architecture, functions, and operations of the system, method, and computer program product according to a plurality of implementations of the disclosure. In this regard, each block in the flowchart or block diagram may represent a module, program segment, or part of an instruction, and the module, program segment, or part of an instruction contains one or more executable instructions for implementing the specified logical functions. In some alternative implementations, the functions marked in the blocks may also occur in an order different from that marked in the accompanying drawings. For example, two consecutive blocks can actually be executed substantially in parallel, or they can sometimes be executed in the reverse order, depending on the functions involved. It should also be noted that each block in the block diagram and/or the flowchart, and a combination of blocks in the block diagram and/or the flowchart may be implemented by a dedicated hardware-based system that executes specified functions or actions, or by a combination of dedicated hardware and computer instructions.

The implementations of the disclosure have been described above. The foregoing description is exemplary, not exhaustive, and is not limited to the disclosed implementations. Many modifications and changes are obvious to those of ordinary skill in the art without departing from the scope and spirit of the described implementations. The selection of terms used herein is intended to best explain the principles of the implementations, the practical application or improvement of the technology in the market, or to enable other ordinary skilled persons in the art to understand the implementations disclosed herein.

We claim:

1. A method for content interaction, comprising:
playing a target video associated with a recommended object, with an entry card superimposed and presented on the target video, the entry card indicating an access entry to the recommended object;
in response to a play progress of the target video reaching a predetermined time point, superimposing and presenting, on the target video, a plurality of images corresponding to a plurality of time points of the target video by replacing the entry card with the plurality of images, the plurality of images being associated with the recommended object; and
in response to the play progress of the target video reaching a first time point of the plurality of time points, highlighting a first image corresponding to the first time point in the plurality of images, and non-highlighting other images in the plurality of images except for the first image.

2. The method according to claim 1, further comprising:
in response to the play progress of the target video reaching a second time point after the first time point, switching the highlighting from the first image to a second image corresponding to the second time point in the plurality of images, and non-highlighting other images in the plurality of images except for the second image.

3. The method according to claim 1, wherein the plurality of time points comprises the predetermined time point, and a predetermined image corresponding to the predetermined time point in the plurality of images matches a video frame of the target video at the predetermined time point.

4. The method according to claim 3, further comprising:
in response to the play progress of the target video reaching the predetermined time point, presenting a video screenshot animation indicating that the video frame of the target video at the predetermined time point is captured as the predetermined image.

5. The method according to claim 4, wherein the plurality of images is superimposed and presented at predetermined positions of a play area of the target video, and the method further comprises:
in response to the play progress of the target video reaching the predetermined time point, moving the predetermined image from a center position of the play area to the predetermined position.

6. The method according to claim 1, wherein the plurality of images is superimposed and presented on the target video in an order of the plurality of time points.

7. The method according to claim 1, wherein superimposing and presenting the plurality of images on the target video comprises:
superimposing and presenting, on the target video, the plurality of images and annotation information respectively associated with the plurality of images, the annotation information being used to describe the recommended object.

8. The method according to claim 1, further comprising:
in response to the play progress of the target video proceeding to behind a last time point of the plurality of time points, superimposing and presenting the plurality of images on the target video in a consistent display manner.

9. The method according to claim 1, wherein configuration information of the target video indicates that the plurality of images are respectively associated with the plurality of time points of the target video, and wherein the configuration information is used to configure superimposing and presenting the plurality of images on the target video and highlighting the plurality of images respectively when the play progress of the target video reaches the plurality of time points.

10. An electronic device, comprising:

at least one processing unit; and at least one memory coupled to the at least one processing unit and storing instructions executable by the at least one processing unit, the instructions, when executed by the at least one processing unit, causing the device to perform acts comprising:

playing a target video associated with a recommended object, with an entry card superimposed and presented on the target video, the entry card indicating an access entry to the recommended object;

in response to a play progress of the target video reaching a predetermined time point, superimposing and presenting, on the target video, a plurality of images corresponding to a plurality of time points of the target video by replacing the entry card with the plurality of images, the plurality of images being associated with the recommended object; and in response to the play progress of the target video reaching a first time point of the plurality of time points, highlighting a first image corresponding to the first time point in the plurality of images, and non-highlighting other images in the plurality of images except for the first image.

11. The electronic device according to claim 10, the acts further comprising:

in response to the play progress of the target video reaching a second time point after the first time point, switching the highlighting from the first image to a second image corresponding to the second time point in the plurality of images, and non-highlighting other images in the plurality of images except for the second image.

12. The electronic device according to claim 10, wherein the plurality of time points comprises the predetermined time point, and a predetermined image corresponding to the predetermined time point in the plurality of images matches a video frame of the target video at the predetermined time point.

13. The electronic device according to claim 12, the acts further comprising:

in response to the play progress of the target video reaching the predetermined time point, presenting a video screenshot animation indicating that the video frame of the target video at the predetermined time point is captured as the predetermined image.

14. The electronic device according to claim 13, wherein the plurality of images is superimposed and presented at predetermined positions of a play area of the target video, and the method further comprises:

in response to the play progress of the target video reaching the predetermined time point, moving the predetermined image from a center position of the play area to the predetermined position.

15. The electronic device according to claim 10, wherein the plurality of images is superimposed and presented on the target video in an order of the plurality of time points.

16. The electronic device according to claim 10, wherein superimposing and presenting the plurality of images on the target video comprises:

superimposing and presenting, on the target video, the plurality of images and annotation information respectively associated with the plurality of images, the annotation information being used to describe the recommended object.

17. The electronic device according to claim 10, the acts further comprising:

in response to the play progress of the target video proceeding to behind a last time point of the plurality of time points, superimposing and presenting the plurality of images on the target video in a consistent display manner.

18. The electronic device according to claim 10, wherein configuration information of the target video indicates that the plurality of images are respectively associated with the plurality of time points of the target video, and wherein the configuration information is used to configure superimposing and presenting the plurality of images on the target video and highlighting the plurality of images respectively when the play progress of the target video reaches the plurality of time points.

19. A non-transitory computer-readable storage medium having a computer program stored thereon, the computer program, when executed by a processor, implementing acts comprising:

playing a target video associated with a recommended object, with an entry card superimposed and presented on the target video, the entry card indicating an access entry to the recommended object;

in response to a play progress of the target video reaching a predetermined time point, superimposing and presenting, on the target video, a plurality of images corresponding to a plurality of time points of the target video by replacing the entry card with the plurality of images the plurality of images being associated with the recommended object; and in response to the play progress of the target video reaching a first time point of the plurality of time points, highlighting a first image corresponding to the first time point in the plurality of images, and non-highlighting other images in the plurality of images except for the first image.

* * * * *